(No Model.)

K. TROBACH.
CHUCK.

No. 268,752. Patented Dec. 5, 1882.

Witnesses:
C. S. Hyer.
J. A. Rutherford.

Inventor:
Konrad Trobach.
By James L. Norris
Attorney

N. PETERS, Photo-Lithographer, Washington, D. C.

UNITED STATES PATENT OFFICE.

KONRAD TROBACH, OF BERLIN, GERMANY, ASSIGNOR TO LOUIS FROBEEN, OF SAME PLACE.

CHUCK.

SPECIFICATION forming part of Letters Patent No. 268,752, dated December 5, 1882.

Application filed July 31, 1882. (No model.)

*To all whom it may concern:*

Be it known that I, KONRAD TROBACH, a subject of the King of Prussia and German Emperor, residing at Berlin, in the Kingdom of Prussia and German Empire, have invented a new and useful Improvement in Chucks, of which the following is a specification.

My invention relates to improvements in chucks to be used in lathes, boring or similar machines for holding or gripping pieces of work, or for other purposes. My said invention is illustrated in the accompanying drawings, in which—

Figure 1:
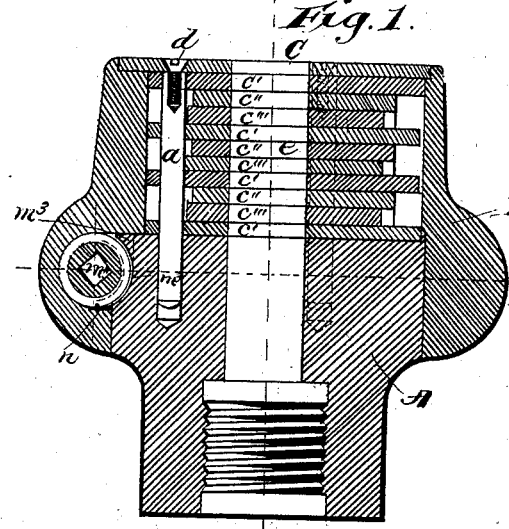
Figure 2:
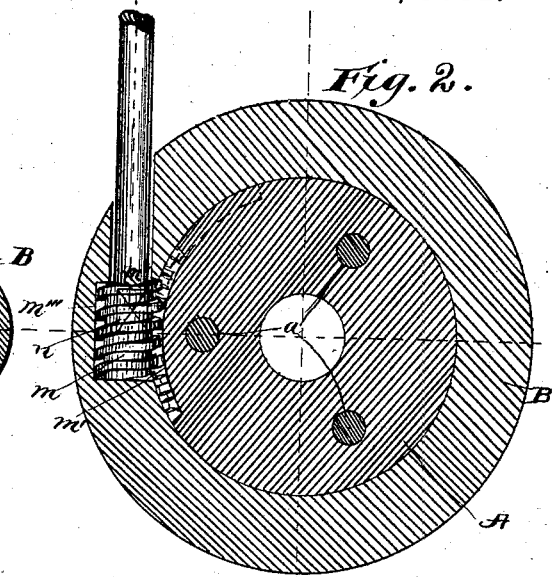
Figure 3:
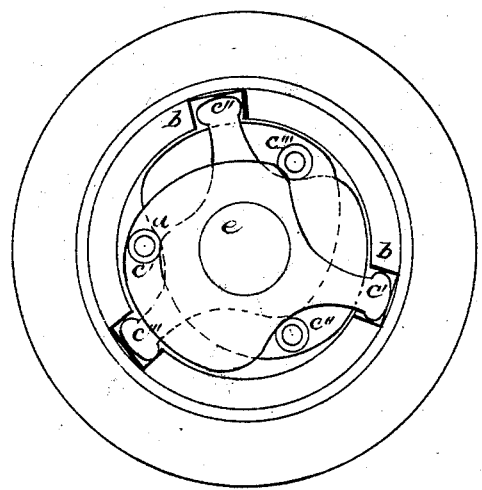
Figure 4:
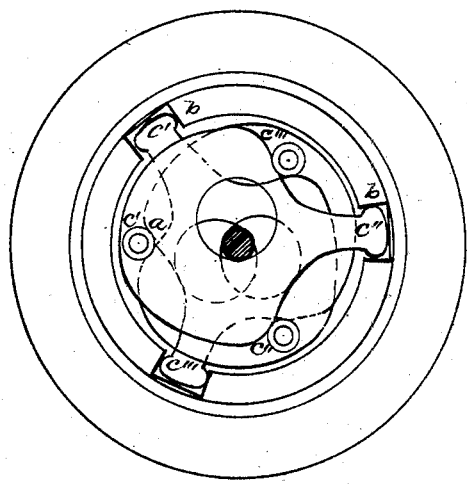

Figure 1 is a vertical section of my improved chuck; Fig. 2, a horizontal sectional view of the same. Fig. 3 is a top view of my said chuck, the cover-plate being removed and the chuck being shown in an open position. Fig. 4 is a similar view, the chuck being shown in a closed or gripping position.

Similar letters refer to similar parts throughout the several views.

My improved chuck consists of the head or block A, having three or more recesses, $i$, for the reception of the corresponding number of tightly-fitting guide-pins $a$. B is the ring, which is fitted upon the head A, said ring being provided with a cylindrical recess, $n$, for the reception of a worm, $m$, loosely resting in the said recess $n$. This worm $m$ catches in the worm-teeth $m'$, cut in part of the circumference of the head A, somewhat below its upper periphery, and is turned by means of a handle, $m''$, with an angular or square end, which is inserted in a corresponding hole in the worm $m$. The ring B, near its inner periphery, is provided with three or more internal longitudinal grooves, $b$, which are arranged opposite to the guide-pins $a$ in the head A. A suitable number of lever-plates, $c'\ c''\ c'''$, which may be stamped out of steel plate or other suitable metal by one and the same die, and which are provided with holes fitting the guide-pins $a$, are alternately placed one on top of the other on these guide-pins in such a manner as to be fulcrumed at the latter, while at their opposite ends, resting in the grooves $b$ of the ring B, they may be swayed around their fulcrum. Three or more of such lever-plates, $c'\ c''\ c'''$, may be applied, the chuck illustrated in the drawings containing ten of them. A cover plate, C, is screwed down on the guide-pins $a$ by means of screws $d$, whose threads exactly fit an inner thread in the guide-pins $a$. By this means the cover-plate C is securely held against the lever-plates, thereby firmly keeping them in position, and also securing the ring B on the head A.

In order to allow the ring B, with its worm loosely resting in the recess $n$, to be slid upon the head A, the latter is partly cut away near the worm-teeth $m'$, as designated by $m'''$. By turning the ring B aside, so as to bring its recess $n$ opposite to the cut-away portion $m''''$ of the head A, the ring B may be slid on the head A, the projecting parts of the worm clearing the head at the cut-away part. By subsequently turning the worm $m$ by means of the handle $m''$ the same is made to mesh with the worm-teeth $m'$ of the head A. The gripping or clutching opening $e$ of the chuck is obtained in the following manner, viz: By turning the handle $m''$ the worm $m$, meshing with the teeth $m'$, revolves the ring B around the head A, having the guide-pins $a$, thereby shifting the lever-plates $c'\ c''\ c'''$ until they will strike with their rounded sides against the inner periphery of the ring B, as shown in Fig. 3. While in this position a central hole is drilled through the cover-plate C and all the lever-plates $c'\ c''\ c'''$.

In applying the chuck the article to be held is inserted in the central hole, and the worm $m$, with the ring B, by means of the handle $m''$, is then turned in an opposite direction. The lever-plates $c'\ c''\ c'''$ are hereby swayed around their fulcrum on the guide-pins $a$, resting in the stationary head A, while their opposite ends firmly rest in the grooves $b$, near the inner periphery of the ring B. The gripping or clutching opening is thereby gradually reduced by the lever-plates $c'\ c''\ c'''$ uniformly crowding the same, so as to hold the article inserted with a firm grip. (See Fig. 4.)

The number of lever-plates may be varied to any desired extent, and their arrangement may be changed by applying four or more guide-pins, $a$, and grooves $b$.

The apparatus may also be used for other purposes—as, for instance, for stretching wire, which may simply be drawn through the accordingly reduced aperture of the chuck while the latter is in rotation. The lever-plates $c'$ $c''$ $c'''$, which constitute the main part of my invention, will then act on the wire in such a manner as to press or beat it straight.

It will be seen that as the pins $a$ are tightly driven or otherwise secured in the sockets $i$ in head A, and the cover-plate C secured to said pins and adapted to extend over a portion of the ring, the latter, while being free to turn on head A, will be held thereon.

Having thus described my invention, what I claim as new, and desire to secure by Letters Patent, is—

1. The combination, in a chuck, of the head A, with a ring, B, fitted to turn upon the said head, and provided with a series of internal longitudinal grooves, $b$, the series of lever-plates $c'$ $c''$ $c'''$, pivoted upon the pins $a$, which are secured in the head and engaging in the grooves, and means, substantially as described, for rotating the said ring, as and for the purpose set forth.

2. The combination, with the head A, of the ring B, fitted to turn upon the head, and provided with internal longitudinal grooves, the series of lever-plates $c'$ $c''$ $c'''$, pivoted upon pins, and engaging in the said grooves, the worm $m$, located within a recess in the ring, and engaging with teeth upon the head, and the cover-plate C, secured to the outer ends of pins $a$, and extending over the ring, so as to hold the same upon the head during operation, substantially as described.

In testimony whereof I have signed my name to this specification in the presence of two subscribing witnesses.

KONRAD TROBACH.

Witnesses:
ROBERT R. SCHMIDT,
B. ROI.